W. J. GIBBONS.
SIGNALING DEVICE FOR AUTOMOBILES.
APPLICATION FILED FEB. 11, 1918.
1,287,668. Patented Dec. 17, 1918.
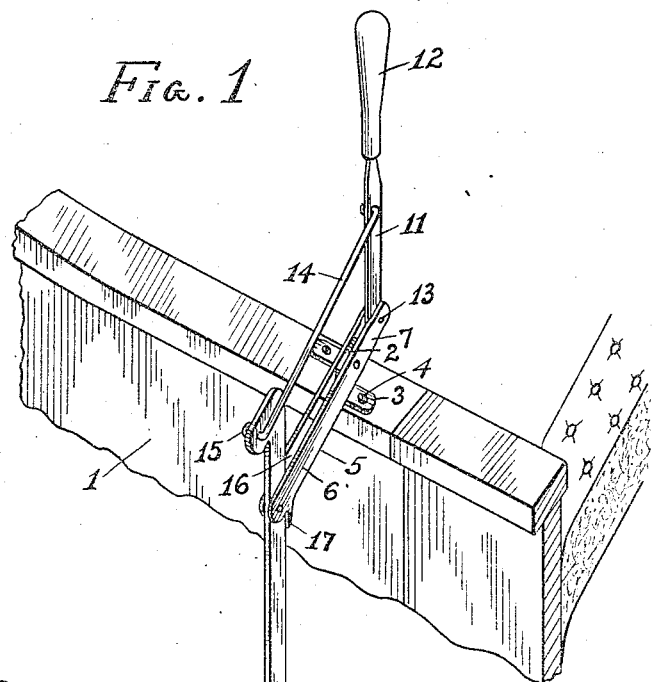
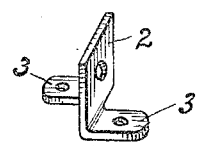
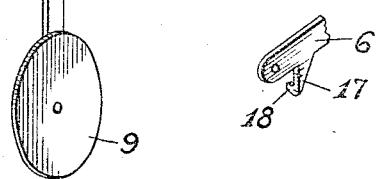
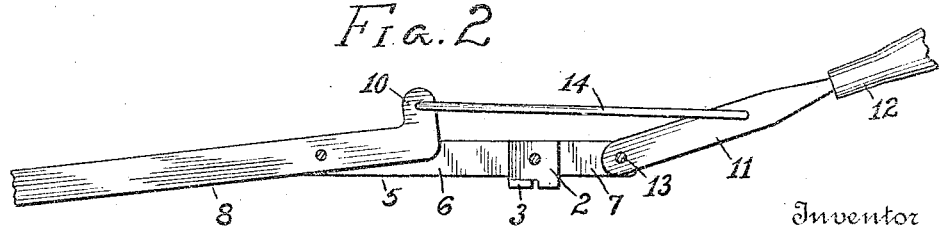
Inventor
W. J. Gibbons
By G. E. Dunstan,
his Attorney

UNITED STATES PATENT OFFICE.

WILLIAM J. GIBBONS, OF CLEVELAND, OHIO.

SIGNALING DEVICE FOR AUTOMOBILES.

1,287,668.  Specification of Letters Patent.  Patented Dec. 17, 1918.

Application filed February 11, 1918. Serial No. 216,576.

*To all whom it may concern:*

Be it known that I, WILLIAM J. GIBBONS, a citizen of the United States, residing at Cleveland, in the county of Cuyahoga and State of Ohio, have invented certain new and useful Improvements in Signaling Devices for Automobiles, of which the following is a specification.

This invention relates to signaling devices, and has for its principal object to provide means which is adapted to be operated by the driver of an automobile to indicate to the driver of an automobile following when he is about to stop or turn a corner.

Other objects of the invention are to provide a signaling device for said purpose, which is very simple in construction, is easy to operate, and one that remains locked in a set position and may be released with little attention on the part of the driver.

With the above and other objects in view as will be readily understood, the invention will be hereinafter fully described with reference to the accompanying drawings, which simply illustrate the same, and the novel features thereof will be distinctly pointed out in the appended claims.

In the drawings, like characters of reference designate corresponding parts.

Figure 1 is a perspective view of a signaling device constructed in accordance with my invention, the same being applied to an automobile, Fig. 2 is a longitudinal section, on an enlarged scale, of a portion of the signaling device when in its set position, Fig. 3 is a perspective view of the flat bracket, and Fig. 4 is a perspective view illustrating the stop for the signaling arm.

Referring to the drawings, 1 represents the side of an automobile, to the top of which is fixed or on any other suitable part of the automobile is arranged, within convenient reach of the driver, the signaling device now to be described. It consists of a stand or bracket 2 made from a piece of flat material and having a pair of oppositely turned feet 3, which are provided with holes for receiving screws 4 for securing it to the automobile. To the sides of this flat bracket, are fixed a pair of flat springs 5, one end 6 of which extends farther from the bracket than the other end indicated by 7. Pivoted between the ends 6 of said flat springs is an arm 8 carrying at its outer end a disk 9, or any other suitable signal such as a hand or a light for at night, and having its other end upturned at 10. For actuating the signaling arm 8, a lever 11 having a suitable handle 12, is pivoted at 13 between the shorter ends 7 of the springs 5, and this lever is pivotally connected to the upturned end 10 of the arm by means of a rod 14, which has inwardly bent ends 15 for entering openings in said parts. The ends 15 of the rod 14 are headed to retain the rod in position. The signaling arm 8 is thicker than the flat bracket 2, in order that it will spread apart the ends of the flat springs 5 and cause them to form a space 16 narrowing toward the bracket for receiving the upturned end of the arm, as it is forced therein by operating the lever 11 to the position shown in Fig. 2 of the drawing. The end of the signaling arm will thus be wedged in between the flat springs 5 and held in a set position. To release the signaling arm, it is only necessary to strike the lever 11 to disengage the arm from the action of the flat springs, and it will fall by gravity to its original position. For preventing the signaling arm 8 swinging beyond a vertical position when released, so that the signal 9 carried thereby will not strike the side of the automobile, a stop 17 depending from one of the flat springs 5 is provided. This stop has an inturned end 18, against which the signaling arm strikes.

It will be understood that slight changes in the construction may be made without departing from the invention as claimed.

Having fully described my invention, what I claim is:

1. In a signaling device for automobiles, the combination of a pair of flat springs, an arm pivoted between the springs and spreading them apart, means for swinging the arm and forcing a part thereof between said springs for holding it in a set position, and a stop carried by one of said springs for preventing the arm swinging beyond a certain point when released, substantially as described.

2. In a signaling device, the combination of a pair of springs, the springs being fixed together at one point, an arm pivoted between the springs and leaving a space therebetween narrowing toward the fixed point, and means for swinging the arm and forcing a part thereof between the springs into said narrowing space for holding the arm in a set position, substantially as described.

3. In a signaling device, the combination of a pair of springs, the springs being fixed together at an intermediate point, an arm pivoted between the springs at one side of the fixed point, a lever pivoted between the springs at the other side of the fixed point, and a rod connecting the lever to the arm whereby the movement of the lever will swing the arm between the springs, substantially as described.

In testimony whereof I affix my signature.

WILLIAM J. GIBBONS.